Aug. 15, 1967    C. A. HAUCK ET AL    3,336,460
METHOD AND APPARATUS FOR SWEEPING ELECTRIC ARCS
Filed June 29, 1966

INVENTORS
CLIFFORD A. HAUCK
JAMES O. BENNETT
BY Barnwell R. King
ATTORNEY

United States Patent Office 3,336,460
Patented Aug. 15, 1967

3,336,460
METHOD AND APPARATUS FOR SWEEPING ELECTRIC ARCS
Clifford A. Hauck, Indianapolis, and James O. Bennett, Martinsville, Ind., assignors to Union Carbide Corporation, a corporation of New York
Filed June 29, 1966, Ser. No. 565,340
12 Claims. (Cl. 219—121)

This application is a continuation-in-part application of application Ser. No. 34,981, filed Oct. 9, 1963, now abandoned.

This invention relates to a multi-arc system for treating work surfaces and more particularly to a method of controlling the sweeping of the electric arcs in such system so as to provide a continuous high intensity sheet-like source of heat.

As used herein the term "sheet-like source of heat" is used to mean a heat source that has considerable length as well as width and is continuous in length and width as far as the workpiece is concerned even though the arc columns in the multi-arc system may appear to be discrete when viewed with the naked eye.

Electric arcs have been used for many years for welding, metal surface treatment, metal cutting and melting metal. In many instances, it is highly desirable to broaden or extend the heating zone of the arc. For example, in metal treatment, it is highly desirable to achieve as broad a uniform heat zone as possible so that a greater area can be achieved for a given pass over the metal being treated. In welding, it is highly desirable to achieve an elongated heat source in the direction of the weld in order to increase welding speeds.

One might assume that the solution of this problem would be easily solved merely by using as many arc devices as is necessary with as many power supplies and connections as is necessary. Such is not the case. Specifically in the case of treating a surface of a metallic slab having considerable width as well as length, it is desirable and preferred to achieve a uniform melt puddle across the width or along the length of the slab. In the past, attempts to achieve this type of puddle resulted in placing multiple arcs fairly close together. The magnetic fields created around the arcs created arc blow and/or arc deflection which was completely uncontrollable and unpredictable. Such systems of course could not produce the continuous uniform heat source required for achieving a uniform melt puddle and thus resort was made to other means of achieving a uniform heat source such as by mechanically controlling the action of widely spaced arcs, for example, by mechanical oscillation.

It is an object of the invention to provide a multi-arc system wherein the arc sweep may be controlled in a predictable manner.

Another object is to provide such a system wherein the arcs may be swept in regular predictable manner to produce a continuous high intensity sheet-like source of heat on a workpiece.

A further object is to provide a method for controlling arc interaction in a system of closely spaced multi-arcs.

A still further object is to provide a system for producing a continuous uniform melt puddle across the width and/or along the length of a metallic slab.

Another object is to provide a method for cleaning relatively wide sheets of metal stock by using the system of the invention.

This invention is based on the discovery that electric arcs can be swept in a controlled and predictable manner by using a multi-arc system which includes electrical arc torches having an electrode and a nozzle wherein an arc is established from the electrode and passes through the nozzle. Gas is introduced into the arc torch such that at least some of the gas is passed into the arc. The gas flow and inside diameter of the nozzle orifice are so correlated so as to provide a directionally stable arc effluent which in the absence of a superimposed magnetic field tends to have persistence in direction. In the preferred embodiment, these arcs are energized from a power supply means such that an A.C. phased voltage is applied at least to alternating arcs to produce interacting magnetic fields among the multi-arcs. The directionally stable arc effluents must be positioned proximately to each other in order to provide interacting magnetic fields.

The phrase "directionally stable" when used herein and in the claims describes an electric arc column in which the longitudinal axis or axes coincident with the flow of current remains invariant in direction regardless of the surrounding environment and of relative motion of the arc column and workpiece except in the presence of magnetic fields which are intentionally provided to sweep or deflect such columns.

There are several methods of producing and maintaining the arcs useful in the system and method of this invention. One such method is disclosed in U.S. Patent 2,806,124, issued Sept. 10, 1957, to R. M. Gage. In essence, such method comprises establishing an arc from a non-consumable electrode, surrounding the electrode with an annular gas stream, directing at least a portion of the gas stream by means of a cold wall nozzle into intimate contact with the arc thereby directionally stabilizing the same. In the present invention, it is desirable to produce directional stability at least by flowing gas in contact with the arc column and preferably in a manner to protect the electrode and work surface.

Figure 1:
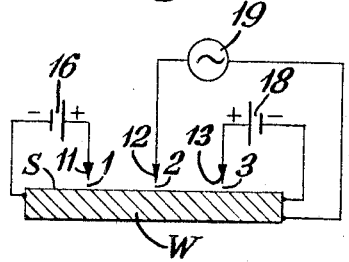
FIGURES 1, 1a and 1b are simplified circuit diagrams of A.C.-D.C. combinations illustrating the invention.
Figure 3:
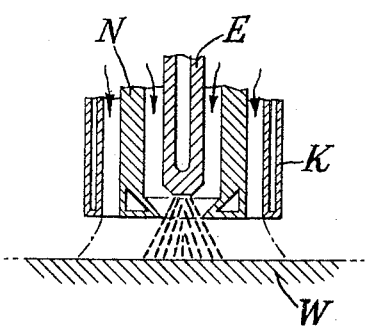
FIGURE 3 is a fragmentary view in section of a torch.

As shown in FIGURE 1, directionally stables arcs 1, 2 and 3 are energized between the upper surface S of workpiece W and electrodes 11, 12 and 13 of suitable torches of the type shown in FIGURE 3, having a stick electrode E and a nozzle N surrounded by a cup K—all water-cooled. The outer electrodes 11 and 13 are connected to D.C. sources 16 and 18, while the inner electrode 12 is connected to a single phase A.C. source 19. Connected, as shown, the two outer arcs are operating on reverse polarity, while the center arc is operating on A.C. current. With this combination, the D.C. arcs (outer) are physically oscillated due to the action of the A.C. arc. This oscillation of the D.C. arcs yields a sweeping action so as to more readily achieve a wider melt with no unmelted gaps between the arcs.

Figure 1A:
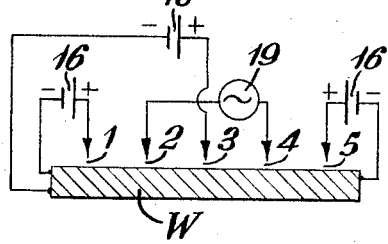

FIGURE 1a depicts a similar concept, except five directionally stable arcs are used. Arcs 2 and 4 are connected to A.C. power source 19 with the current circuit being completed through the workpiece W. Arcs 1, 3 and 5 are connected to the workpiece for reverse or straight polarity. That is, the electrode E may be either positive or negative wtih respect to the work connection. This combination causes directionally stable arcs 1, 3 and 5 to oscillate so as to yield a sweeping action and thus achieve a wider melt.

Figure 1B:
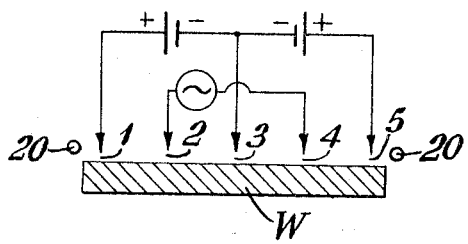

FIGURE 1b depicts an alternate form of FIGURE 1a. In this form, the sweeping action of the arcs is readily achieved and, in addition, there need be no electrical connection to the workpiece W. As shown, arcs 2 and 4 are operating on A.C., the current circuit being completed through the workpiece. Arcs 1 and 5 are operating on reverse polarity while arc 3 is operating on straight polarity, the current circuit again being completed through the workpiece.

It should be noted that in the circuits of FIGS. 1 and 1a, the amount of current for the A.C. arcs should be substantially the same within each circuit as that for the D.C. arcs. Should the amount of currents become substantially unequal, the arcs would not sweep properly and control of the melt width would be extremely difficult.

Figure 2A:
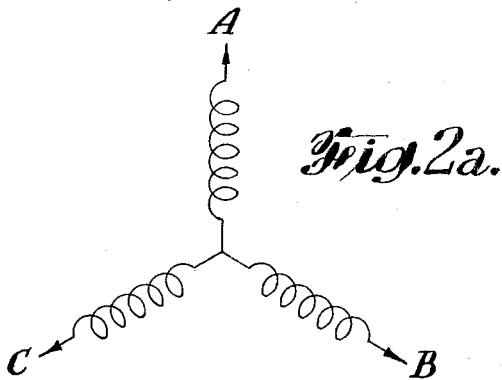
FIGURES 2a and 2b are simplified circuit diagrams illustrating a polyphase A.C. modification.
Figure 2B:
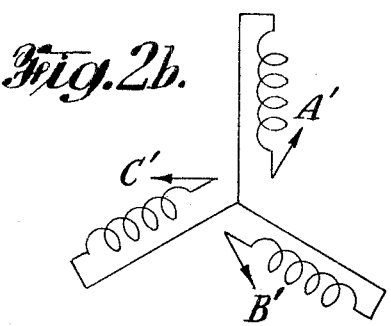
Figure 2C:
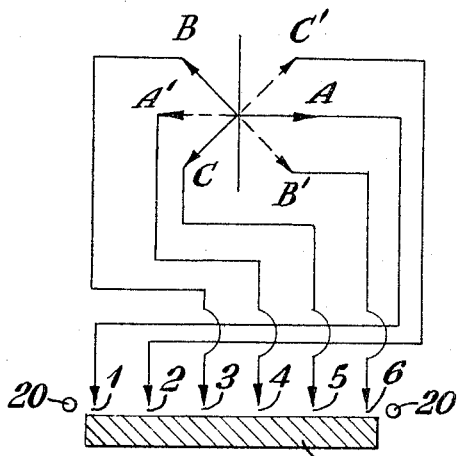
FIGURE 2c illustrates a preferred six phase A.C. embodiment of the invention.

With reference to FIGS. 2a and 2b, A, B, C represent sources of three voltages each 120° out of phase with respect to the others; i.e., this is a conventional 3-phase power source. If the leads to the coils of a similar 3-phase source are transposed as shown in FIG. 2b, a second group of three voltages A', B', C' is obtained, each 120° out of phase with respect to the others in that group, but differing by 180° from the group of FIG. 2a. Together the two groups represent a 6-phase power source; i.e., the sequence shown vectorially in FIG. 2c represents six voltages each differing in phase by 60 electrical degrees from its two immediate neighbors.

In order to insure that such relationship is maintained when used in the present system it is necessary that the terminals for the power supplied be connected to the torches in the proper sequence. That is, regardless of which terminal is connected to the first arc, the next terminal, moving either clockwise or counterclockwise around the vector diagram, is connected to the next succeeding arc. Again, the current circuit is completed through the workpiece. Using such variation, the 4 center arcs will sweep across the workpiece.

There will, however, be some tendency for the two outer arcs to deflect outwardly from the group. This can be overcome through magnetic stabilization of the outer arcs, or "pointing" the arcs toward the 4 center arcs. Another preferred method of controlling the outer arcs, is to position U-shaped tubes or rods 20, FIG. 1b, in close proximity to the outer arcs to pass current through them. Thus, when the outer arcs are operating on direct current, the current flowing through the tubes should be in a direction opposite that of the current in the arc. With the outer arcs operating on alternating current, FIG. 2c, the current through the tube 20 should also be alternating and should be either 60 or 120 degrees out of phase with the current in the outer arc. Such variations in addition to not requiring an electrical connection at the workpiece, yield a much wider melt width. Further, the melt width can be readily increased merely by using this concept to increase the number of arcs in increments of six.

It has been discovered that a directionally stable arc is essential for the successful operation of the electrical circuits just described. Arcs which do not have directional stability as defined herein tend to wander over the work surface until a hot spot is created. Until such hot spot is created, the arc is unstable. Once the hot spot is established the arc will tend to remain fixed to such spot so that as relative motion is provided the arc will bend. Both of these conditions make it difficult to control the magnetic interaction between closely spaced arcs. It has been found that the effect of the magnetic fields created around directionally stable arcs produced by an arc device having given geometry can be varied by changing at least one of the following: the arc current, gas flow or the arc length, that is the distance from the nozzle to work surface. Increasing gas flow increases the degree of directional stability and decreases the magnetic effect.

It has been found further that the best controlled sweeping of directionally stable arcs to date is obtained in a 6 arc, six-phase A.C. power system or in 6 arc multiples thereof such as twelve, eighteen, etc. Investigations show that strong attraction of the arc columns occurs for in phase currents while strong repulsion occurs for currents 180 degrees out of phase. Ninety degree out of phase currents would produce the most symmetrical sweeping of the arcs.

A six-phase system incorporating at least six directionally stable arcs has been used successfully in several metal heat treating processes. For example in the method for cladding a base metal slab as described in application Ser. No. 359,952, filed Apr. 15, 1964, and copending herewith, the inventive system produces controlled arc sweep resulting in a continuous uniform molten puddle that is essentially coextensive with the width of the slab. A relative deep, wide and uniform penetration into the base metal can be achieved with the sweeping, directionally stable high intensity arcs of the invention. In such method, the control of gas flow and arc current which is obtainable with directionally stable arc devices especially of the type described by Gage in U.S. Patent 2,806,124 not only provides means for changing the affect of the interacting magnetic fields of the arc system but also provides some means for controlling the depth and uniformity of penetration of the slab surface. The gas flow and arc current can be used to provide sufficient momentum to melt to the depth desired while providing a uniform mixing of the melt puddle formed on the work surface.

In an example of the usefulness of the present invention for arc alloying an array of 3 rows of six directionally stable arc producing devices of the general type shown in FIGURE 3 where connected in a six (6) phase 60 cycle A.C. power supply circuit. The arc length was 1". Torch spacing was 1⅛". Electrode diameter was ¼". Electrode set-back ¼". Nozzle diameter ⁵⁄₁₆". Gas flow 60 s.c.f.h./torch. Arc current 330 amps. Arc voltage 35 v. A slab 5" x 17" x 24" of rimmed steel was covered with ferroalloy to a depth of ⅜". A water solution of sodium silicate was used as a binder, and the coated slab was preheated to 1400° F. Two passes at a travel speed of 3.7 i.p.m. were sufficient to alloy the entire width of the slab to a depth of ½ inch. An overlay of about 1 inch was used between passes and a mechanical oscillation of 1¾ inch was superimposed on the system. The alloyed layer was compositionally homogeneous and surface quality was good.

In another example the current connection shown in FIGURE 1 was used with three directionally stable arc producing devices. In this example, one side of a 3" thick low carbon steel was alloyed with .0237 lbs./in. of 70% Cr bearing ferrochrome. A diluted water solution of sodium silicate was sprayed on the ferrochrome powder to bind it together. The slap was preheated to about 1200° F. The alloying was made in two passes. The torches were oscillated at a 1½" amplitude at 18 c.p.m. The torch conditions were as follows:

|  | Torch 1st pass | 2nd pass |
| --- | --- | --- |
| Voltage (volts) | 1. (DCRP) 45-50 | 45-50 |
|  | 2. (AC) 30-45 | 30 |
|  | 3. (DCRP) 45-50 | 45-50 |
| Current (amperes) | 1. 1,250 | 1,250 |
|  | 2. 550 | 560 |
|  | 3. 1,250 | 1,250 |

Argon gas was used throughout the system. Torches 1 and 3 had 125 c.f.h. of argon passing through them, while torch 2 had 100 c.f.h. The torches were all enclosed in a box through which 500 c.f.h. of argon was flowing. In addition a trailing gas stream of 500 c.f.h. was used.

On the 1st pass the workspeed was 3.4 in./min., on the second 3.7 in./min. The torch standoff from the powder was about ½". The first pass was approximately 6½" wide and the surface was smooth. On the second pass there was a ¾" overlap yielding an alloyed layer 12 inches wide. The surface was smooth.

Chemical analysis taken at four points across the two passes showed chrome contents of 20.1, 18.7, 18.7, and 17.9% by weight. The average depth of the alloy was 0.3 inch.

The inventive system is also useful for melting a uniform pass on a surface of a workpiece. In this case, the circuit of FIG. 1 was used. Each electrode consisted of 1% thoriated tungsten, 1 inch in diameter. The gas cup had a 1⅛ inch diameter orifice. The workpiece W consisted of a Type 430 stainless steel casting to be surface conditioned. The process conditions were as follows:

| Arc | Power Connection | Current | Workspeed, i.p.m. | Argon, c.f.h. |
|---|---|---|---|---|
| 1 | DCRP | 1,400 | | 500 |
| 2 | AC | 1,200 | 6 (av.) | 500 |
| 3 | DCRP | 1,400 | | 500 |

Under such conditions, an area 8″ wide x ⅜″ deep was remelted. The surface was smooth with a slight surface scale.

In another example, the current connection of the type described in FIGS. 2a, 2b and 2c was used. The electrodes consisted of water cooled 1% thoriated tungsten, ½ in. dia. inserts. The gas cup had a ¾ inch inside diameter. The 6 torches were positioned in a row, 1¹³⁄₁₆″ apart and were sequentially connected to a 6-phase power system. The direction of travel of the workpiece was normal to the row. The workpiece consisted of a Type 430 stainless steel casting to be conditioned. The current for each electrode was 800–900 amperes. The workspeed varied from 4–5 i.p.m. Argon gas at the rate 125 c.f.h. was discharged around each electrode. In addition, 1000 c.f.h. of argon was passed around the complete set of torches in order to insure a completely inert environment. Under such conditions an area 13 inches wide was remelted. The estimated depth of the remelted area was ¼ inch.

The controlled arc sweeping achieved by the present invention has also been used to descale or otherwise clean metal stock in relatively wide passes. In this application, the arcs are passed across the surface to be cleaned without melting the surface. Cleaning is believed to be a result of the action caused by positive ion bombardment at the cathode terminal of the arc. In using the present invention for cleaning, the arcs must be operated at lower currents than in arc alloying. Alternatively, much faster traverse speeds must be employed or a combination of both faster speeds and lower currents must be employed.

Since arc cleaning is based on positive ion bombardment at the cathode terminal surface, it becomes apparent that when using the current connections shown to obtain controlled sweeping, that cleaning action with respect to any single electrode is being effected on every other half-cycle of the arc power. For this reason, the traverse speed becomes critical within the range of the higher speeds needed for arc cleaning. At too low a speed there will be a tendency for the arc to stick, causing melted areas, while on the other hand when the speed becomes excessive, the complete width of the area being cleaned will not be covered. The exact speeds would, of course, be dependent upon a number of factors such as arc current, gas flow rate, type of stock being cleaned, etc.

The following table shows the effect of traverse speed in cleaning oxidized stainless steel. In acquiring the data, the current connections of FIGURE 2c was used. There were 18 torches, three rows, with six torches in each row. This covered an area about 7 inches in width.

*Table.— Operating conditions, arc cleaning*

| | |
|---|---|
| Arc current _____ amperes | 160–245 |
| Arc voltage _____ | 30–45 |
| Total arc power _____ kw | 85–200 |
| Argon flow rates: | |
|   Per torch _____ c.f.h | 25–50 |
|   Through shielding box _____ c.f.h | 300 |
| Workspeeds _____ i.p.m | 40–800 |

Gas flow rates employed were less than those normally used for surface melting since a less intense arc with greater sweep seemed desirable for cleaning.

Having described the invention with reference to certain preferred embodiments and having described certain utility for such invention, it is to be understood that the spirit and scope of the invention is not to be so limited.

What is claimed is:

1. A method for obtaining controlled arc sweeping in a multi-arc working system for treating a surface of a workpiece which comprises establishing at least three arcs at given current levels from electrodes provided in arc devices which include a nozzle having an outlet passage; confining the arc in the nozzle; introducing gas through the nozzle and into the arc the combination of said gas flow and outlet passage nozzle diameter providing a directionally stable arc effluent in the absence of superimposed magnetic fields; positioning said directionally stable arc effluents proximately to each other so that the magnetic fields created around each of said arcs affects the arcs in immediate proximity therewith; energizing said arcs such that an A.C. voltage is applied at least to alternating arcs to produce said interacting magnetic fields among said multi-arcs; spacing said electrodes from the surface of said workpiece such that the lengths of said arcs may be swept across such surface; and varying at least one of said arc currents, said gas flow, and said arc length to change the affect said interacting magnetic fields have on said arcs and thereby control the sweep of said arcs.

2. Method as defined by claim 1, in which adjacent arcs are energized by D.C. and A.C.

3. Method as defined by claim 1, in which adjacent arcs are energized by A.C.

4. Method according to claim 1 wherein the multi-arcs are used to heat the surface of the workpiece.

5. Method according to claim 3 wherein at least six directionally stable arcs are arranged in relatively closely spaced relationship to one another and each set of six arcs is connected to a six phase A.C. power system.

6. Method according to claim 9 wherein the multi-arcs are used to heat but not melt the surface of the workpiece to thereby clean said surface.

7. A multi-arc working system for treating a workpiece which comprises three closely spaced electric arc torches each furnished with an electrode and a nozzle wherein an arc is established from said electrode and passes through said nozzle; the center electrode being energized by a single phase A.C. source, and the outer electrode is energized by D.C. sources of similar polarity; means for flowing gas into said arc torch such that at least some of the gas is passed into the arc; the inside diameter of said nozzle and said gas flow being so correlated as to provide a directionally stable arc effluent in the absence of a superimposed magnetic field, said torches being arranged in a row in a common plane in a parallel relationship to one another to provide individual arc gap with said workpiece; and power supply means for energizing said multi-arcs with a voltage selected so that such arcs interact with one another to cause them to oscillate with respect to one another with a sweeping motion on such workpiece.

8. A multi-arc working system for treating a workpiece which comprises five closely spaced electric arc torches each furnished with an electrode and a nozzle wherein an arc is established from said electrode and passes through said nozzle; the outer and center electrodes are energized by D.C. sources of similar polarity, and the intermediate electrodes are energized by a common single phase A.C. source; means for flowing gas into said arc torch such at at least some of the gas is passed into the arc; the inside diameter of said nozzle and said gas flow being so correlated as to provide a directionally stable arc effluent in the absence of a superimposed magnetic field, said torches being arranged in a row in a common plane in a parallel relationship to one another to provide individual arc gap with said workpiece; and power supply means for energizing said multi-arcs with a voltage selected so that such arcs interact with one another to cause them to oscillate with respect to one another with a sweeping motion on such workpiece.

9. A multi-arc working system as defined by claim 8 wherein the outer and center electrodes are energized by D.C. sources of opposite polarity and the intermediate electrodes are energized by a common single phase A.C. source.

10. A multi-arc working system for treating a workpiece which comprises at least three closely spaced electric arc torches furnished with an electrode and a nozzle wherein an arc is established from said electrode and passes through said nozzle; means for flowing gas into said arc torch such that at least some of the gas is passed into the arc; the inside diameter of said nozzle and said gas flow being so correlated as to provide a directionally stable arc effluent in the absence of a superimposed magnetic field, said torches being arranged in a row in a common plane in a parallel relationship to one another to provide individual arc gap with said workpiece; and power supply means for energizing said multi-arcs with a voltage selected so that such arcs interecat with one another to cause them to oscillate with respect to one another with a sweeping motion on such workpiece, and wherein each arc is shielded by a stream of protective gas discharged around the tip of the corresponding electrode from a suitable nozzle, and such nozzle is in turn shielded by another stream of protective gas discharged around it in the direction of such surface, so that the entire surface area that is heated by such arcs is also protected by such gas stream from the atmosphere.

11. A multi-arc working system for treating a workpiece which comprises at least three closely spaced electric arc torches furnished with an electrode and a nozzle wherein an arc is established from said electrode and passes through said nozzle; means for flowing gas into said arc torch such that at least some of the gas is passed into the arc; the inside diameter of said nozzle and said gas flow being so correlated as to provide a directionally stable arc effluent in the absence of a superimposed magnetic field, said torches being arranged in a row in a comman plane in a parallel relationship to one another to provide individual arc gap with said workpiece; and power supply means for energizing said multi-arcs with a voltage selected so that such arcs interact with one another to cause them to oscillate with respect to one another with a sweeping motion on such workpiece, and including means acting to bias the outer arcs inwardly to overcome any objectional tendency of such arcs to deflect outwardly.

12. A multi-arc working system as defined by claim 11, in which such arc biasing means includes an electrical conductor located on the outer side of each outer arc, carrying a current the field of which effectively influences the corresponding arc to overcome such objectionable tendency to deflect outwardly.

References Cited

UNITED STATES PATENTS

| 218,749 | 8/1879 | Jamin | 314—20 X |
| 2,125,172 | 7/1938 | Kinzel | 219—50 X |
| 2,436,387 | 2/1948 | Harter et al. | 219—130 |
| 2,806,124 | 9/1957 | Gage | 219—121 |
| 2,837,627 | 6/1958 | Soulary | 219—131 X |
| 3,050,616 | 8/1962 | Gage | 219—69 |

OTHER REFERENCES

"Methods of Controlling Arc Blow," The Welding Engineer, April 1932, pages 44–46.

JOSEPH V. TRUHE, *Primary Examiner.*

UNITED STATES PATENT OFFICE

CERTIFICATE OF CORRECTION

Patent No. 3,336,460                                  August 15, 1967

Clifford A. Hauck et al.

It is hereby certified that error appears in the above numbered patent requiring correction and that the said Letters Patent should read as corrected below.

Column 6, line 40, for the claim reference numeral "9" read -- 1 --.

Signed and sealed this 10th day of December 1968.

(SEAL)
Attest:

Edward M. Fletcher, Jr.                           EDWARD J. BRENNER
Attesting Officer                                        Commissioner of Patents